(12) United States Patent
Scudamore et al.

(10) Patent No.: US 8,215,611 B2
(45) Date of Patent: Jul. 10, 2012

(54) SOLENOID VALVE HAVING A TWO PIECE MOVING VALVE ELEMENT

(75) Inventors: Gerald Scudamore, Chepstow (GB); Cain Barnish, Wiltshire (GB); Paul Ellison, Bristol (GB)

(73) Assignee: IMI Webber Limited, Bristol (GB)

( * ) Notice: Subject to any disclaimer, the term of this patent is extended or adjusted under 35 U.S.C. 154(b) by 446 days.

(21) Appl. No.: 12/522,458

(22) PCT Filed: Jan. 22, 2007

(86) PCT No.: PCT/EP2007/000501
§ 371 (c)(1),
(2), (4) Date: Jul. 8, 2009

(87) PCT Pub. No.: WO2008/089783
PCT Pub. Date: Jul. 31, 2008

(65) Prior Publication Data
US 2010/0037956 A1  Feb. 18, 2010

(51) Int. Cl.
*F16K 31/10* (2006.01)
(52) U.S. Cl. ................................ 251/129.19; 251/77
(58) Field of Classification Search ............ 251/77, 251/129.19
See application file for complete search history.

(56) References Cited

U.S. PATENT DOCUMENTS

| 876,274 | A | * | 1/1908 | Kintner | 251/129.19 |
| 2,644,404 | A | * | 7/1953 | Bobo | 251/77 |
| 2,666,451 | A | * | 1/1954 | Ray | 251/77 |
| 3,100,103 | A | * | 8/1963 | Bullard | 251/30.03 |
| 3,473,780 | A | * | 10/1969 | Harms | 251/129.19 |
| 3,671,009 | A | * | 6/1972 | Stampfli | 251/129.19 |
| 4,008,876 | A | * | 2/1977 | Bastle | 251/129.19 |
| 4,526,340 | A | * | 7/1985 | Kolchinsky et al. | 251/77 |
| 4,592,533 | A | * | 6/1986 | Guglielmi et al. | 251/77 |
| 5,358,005 | A | * | 10/1994 | van Prooijen et al. | 251/129.19 |
| 6,293,513 | B1 | * | 9/2001 | Birkelund | 251/77 |
| 6,390,444 | B1 | * | 5/2002 | Moreno et al. | 251/129.19 |
| 2005/0145812 | A1 | | 7/2005 | Kumar | |

FOREIGN PATENT DOCUMENTS

DE  102004009670 A1  1/2005
GB  1423340 A  2/1976

* cited by examiner

*Primary Examiner* — Eric Keasel
(74) *Attorney, Agent, or Firm* — The Ollila Law Group LLC

(57) ABSTRACT

A system and method for operating a solenoid valve is disclosed. The solenoid valve is operated by moving a first valve element (4) with respect to a second valve element (6, 7) a first distance. And then pulling the second valve element (6, 7) with the first valve element (4) a second distance where the second valve element (6, 7) moves against resistance from a seal (8) and where the movement of the second valve element (6, 7) opens a gap with respect to an orifice (10). The second element (6, 7) then moves a third distance under spring load to open an increased gap with respect to the orifice (10).

16 Claims, 1 Drawing Sheet

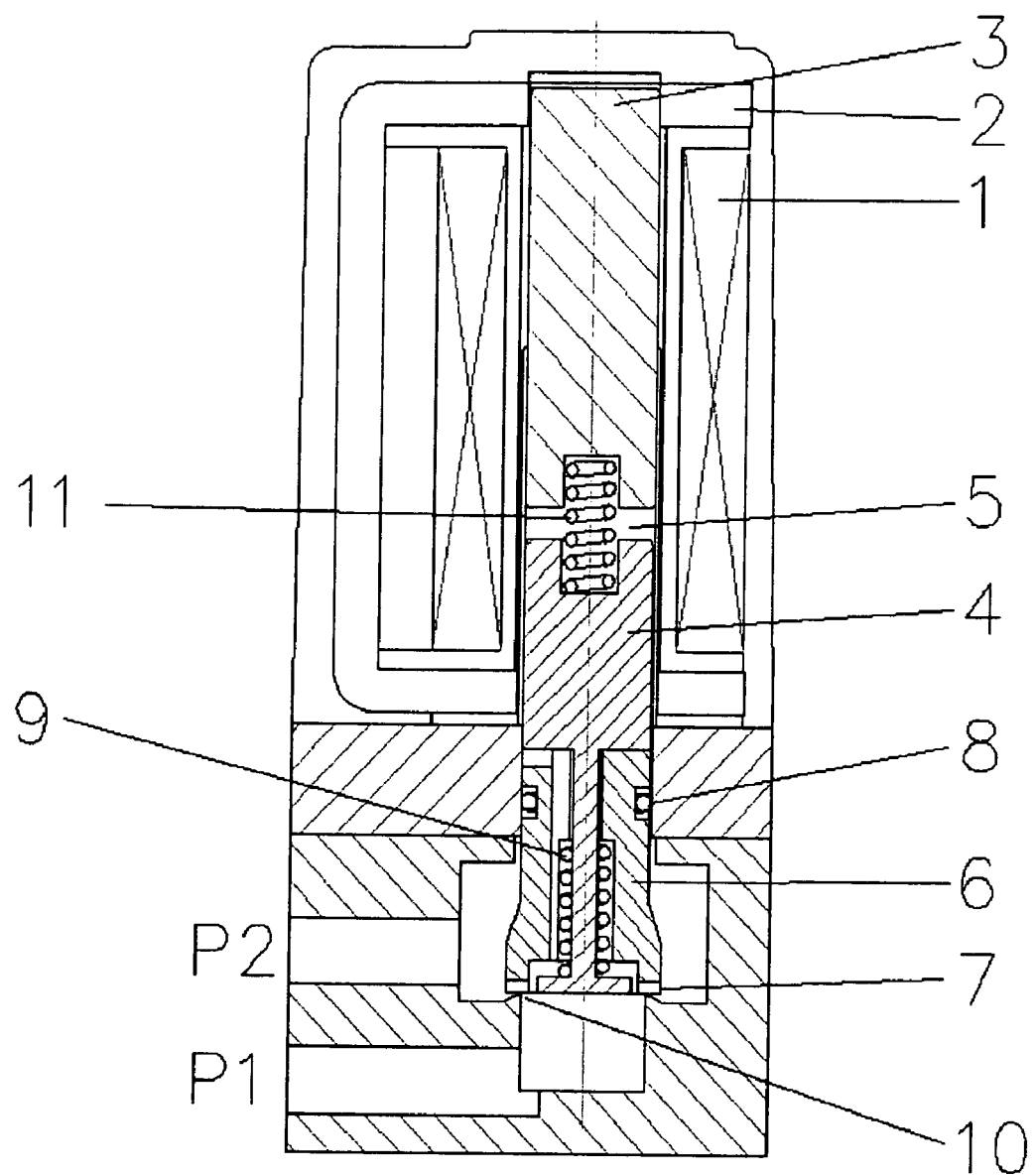

SOLENOID VALVE HAVING A TWO PIECE MOVING VALVE ELEMENT

BACKGROUND OF THE INVENTION

Typical direct acting solenoid valves employ an armature containing a seal which is held against an orifice by a spring. Fluid pressure acts over the orifice area either against or with the spring load, giving a tendency either to leak or prevent opening of the valve. Some solenoid valves employ "balanced" armatures where the pressure across the orifice is counteracted by pressure across a seal of the same effective diameter as the orifice. This results in a significantly reduced load across the armature, particularly at higher pressure differentials. Balanced valves may have a significant seal frictional force that the valve needs to overcome to operate. The frictional forces typically increase with increasing pressure differential between the ports of the valve and with increasing seal diameter.

BRIEF DESCRIPTION OF THE DRAWINGS

FIG. 1 is a sectional view of a solenoid valve in an example embodiment of the invention.

DETAILED DESCRIPTION OF THE PREFERRED EMBODIMENT

FIG. 1 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 is a sectional view of a solenoid valve in an example embodiment of the invention. Solenoid valve comprises a solenoid coil 1, an iron circuit 2, a fixed stem 3, a moving armature 4, a seat housing 6, a seat 7, a seal 8, a return spring 9, an orifice 10, and a main spring 11. In some embodiments of the invention the seat housing 6 and the seat 7 may be integrated into one piece. A magnetic circuit in the solenoid valve comprises the solenoid coil 1, the iron circuit 2, the fixed stem 3, and the moving armature 4. The effective magnetic force acting on the armature 4 increases with increasing coil power and/or a decrease in the size of gap 5 between the armature 4 and fixed stem 3. The armature 4, the seat housing 6, the seat 6, the seal 8 and the return spring comprise an armature/seat subassembly. Main spring 11 holds armature/seat subassembly against orifice 10. Fluid connections are made through ports P1 and P2 where a port is coupled to each side of orifice 10.

In operation, when the coil is not energized the seat 7 is held against the orifice 10 by main spring 11 acting through the armature 4 and seat housing 6. The armature 4 is contained wholly within the fluid of port P1. Because armature 4 is completely surrounded by the fluid from port P1 the armature does not need any sealing elements and does not have a pressure differential across any part of the armature 4. The fluid from port P1 is sealed from entering port P2 in two places. The first place is between the seat holder 6 and the valve body at the location of seal 8. The second place is between the seat 7 and the orifice 10. In one example embodiment of the invention the seal 8 in seat housing 6 and the orifice diameters 10 are closely matched to reduce or balance the net load due to the pressure differential across seat housing 6. In another example embodiment of the invention, the diameter of seal 8 and the orifice diameter are intentionally miss-matched to create a force between the seat housing 6 and the orifice 10 when the valve is closed. The force is due to the net difference in area under pressure between the seal 8 and the orifice 10. The direction of the force can be changed by making the seal diameter larger than, or smaller than, the orifice diameter. The direction of the net biasing force can be used to increases the force between the seat housing 6 and the orifice 10 or decrease the force between the seat housing 6 and the orifice 10. In one example embodiment of the invention the orifice edge radius is kept small to minimize the effective seating width which may help maintain low pressure load hysteresis. As the coil 1 is energized, the armature 4 is pulled towards the stem 3 against the combined force of the main spring 11 and the return spring 9. In one example embodiment of the invention, the initial gap 5 is approximately 2 mm. Other initial gap sizes may be used. After traveling a short distance without any resistance due to seals, the armature contacts the seat housing 6. In one example embodiment of the invention, the short travel distance is approximately 1 mm or half the initial gap 5. Other short travel distances may be used and the short travel distance may be a smaller or larger fraction of the initial gap. Once the armature 4 has contacted the seat housing 6, the armature 4 will pull the seat housing 6 along with the armature 4. To move the seat housing 6 the armature 4 must overcome the friction between seal 8 in the seat housing 6 and the body of the valve. The armature 4 may also be required to overcome a net pressure load when initially moving the seat housing 6. These additional forces are overcome by the increased magnetic force due to the reduced gap 5 and by the momentum of the moving armature 4. By using the higher magnetic forces and the momentum of the moving armature to overcome the seal friction and any pressure differential, a smaller coil or lower coil power can be used for a given size solenoid valve. As seat housing 6 and seat 7 move away from orifice 10, fluid flow between port P1 and P2 is enabled. As the armature 4 and seat housing 6 continue to move, armature will reduce gap 5 to zero and contact stem 3. In this state, full flow may not yet be established as the space between the seat 7 and the orifice will be approximately 1 mm. Return spring 9 will continue to move seat housing 6 away from orifice until the top side of seat housing 6 contacts armature 4. Once seat housing 6 contacts armature 4 the gap between seat 7 and orifice 10 will be at the maximum size.

The operating sequence for opening the valve starts when the coil 1 is energized. The energized coil 1 causes the armature to move a first distance before contacting one end of the seat housing 6. Once the armature 4 has contacted the seat housing 6, the energized coil 1 moves both the armature 4 and the seat housing 6 a second distance until the armature 4 contacts the fixed stem 3. The return spring 9 continues to move the seat housing 6 a third distance until the seat housing 6 contacts the other end of the armature 4.

To close the valve, coil 1 is de-energized and main spring 11 forces armature 4, seat housing 6 and seat 7, back down against orifice 10.

We claim:
1. A solenoid valve, characterized by:
a valve seat (6, 7) configured to move between a closed position, a partially opened position and a fully opened position with respect to a valve orifice (10);

an armature (4) configured to move between a first position and a second position with respect to the valve seat (6, 7) and where the armature (4) is biased towards the first position by a biasing force acting against the valve seat (6, 7);
a valve body having a first fluid port (P1) and a second fluid port (P2) where the first fluid port (P1) fluidly couples to a first side of the valve orifice (10) and the second fluid port (P2) fluidly couples to second side of the valve orifice (10);
a sealing member (8) attached to the valve seat (6, 7) and forming a seal between the valve seat (6, 7) and the valve body and where the sealing member (8) prevents fluid flow between the first fluid port (P1) and the second fluid port (P2) when the valve seat (6, 7) is in the closed position;
a magnetic circuit that, when energized, pulls the armature (4) from the first position to the second position;
once the armature (4) reaches the second position, the magnetic circuit, using the armature (4), pulls the valve seat (6, 7) from the closed position to the partially opened position; and
once the valve seat (6, 7) reaches the partially opened position, the biasing force moves the valve seat (6, 7) to the fully opened position.

2. The solenoid valve of claim 1 where the armature (4) is surrounded within a chamber that is coupled to the first fluid port (P1).

3. The solenoid valve of claim 2 where a diameter of the sealing member (8) is approximately equal to a diameter of the valve seat (7).

4. The solenoid valve of claim 2 where a diameter of the sealing member (8) is larger than a diameter of the valve seat (7).

5. The solenoid valve of claim 2 where a diameter of the sealing member (8) is smaller than a diameter of the valve seat (7).

6. The solenoid valve of claim 1 where a gap (5) between the armature (4) and the fixed stem (3) is at a first size when the armature (4) is in the first position and is at a second size when the armature (4) is in the second position where the first size is larger than the second size.

7. The solenoid valve of claim 6 where the gap (5) is zero when the valve seat (6, 7) is in the partially opened position.

8. The solenoid valve of claim 1 where the biasing force is created with a return spring (9).

9. The solenoid valve of claim 1 farther characterized by:
a main spring (11) configured to move the armature (4) to the first position and the valve seat (6, 7) to the closed position when the magnetic circuit is not energized.

10. A method of operating a solenoid valve, comprising:
providing a valve seat configured to move between a closed position, a partially opened position and a fully opened position with respect to a valve orifice;
providing an armature configured to move between a first position and a second position with respect to the valve seat and where the armature is biased towards the first position by a biasing force acting against the valve seat;
providing a valve body having a first fluid port and a second fluid port where the first fluid port fluidly couples to first side of the valve orifice and the second fluid port fluidly couples to a second side of the valve orifice;
providing a sealing member attached to the valve seat and forming a seal between the valve seat and the valve body and where the sealing member prevents fluid flow between the first fluid port and the second fluid port when the valve seat is in the closed position;
moving the armature (4) with respect to the valve seat (6, 7) a first distance;
pulling the valve seat (6, 7) with the armature (4) a second distance where the valve seat (6, 7) moves against resistance from the seal (8) and where the movement of the valve seat (6, 7) opens a gap with respect to an orifice (10).

11. The method of operating a solenoid valve of claim 10 where a first force created from pressure from the first fluid port (P1) acting against the seal (8) is approximately equal to a second force created from pressure from the first fluid port (P1) acting against a seat (7) on the valve seat (6, 7) that seals against the orifice (10).

12. The method of operating a solenoid valve of claim 11 where the armature (4) is surrounded by the pressure from the first fluid port (P1).

13. The method of operating a solenoid valve of claim 10 further characterized by:
moving the valve seat (6, 7) with respect to the armature (4) a third distance where the movement of the valve seat (6, 7) opens the gap with respect to the orifice and where the opened gap has a length equal to the second distance and the further opened gap has a length equal to the second distance plus the third distances.

14. The method of operating a solenoid valve of claim 10, further characterized by:
moving the armature (4) with respect to the valve seat (6, 7) with a force from a magnetic circuit;
increasing the force produced by the magnetic circuit as the armature (4) moves with respect to the valve seat (6, 7) by reducing a distance between the armature (4) and a fixed element in the magnetic circuit.

15. The method of operating a solenoid valve of claim 10 where a first force created from pressure from the first fluid port (P1) acting against the seal (8) is larger than a second force created from pressure from the first fluid port (P1) acting against a seat (7) on the valve seat (6, 7) that seals against the orifice (10).

16. The method of operating a solenoid valve of claim 10 where a first force created from pressure from the first fluid port (P1) acting against the seal (8) is smaller than a second force created from pressure from the first fluid port (P1) acting against a seat (7) on the valve seat (6, 7) that seals against the orifice (10).

* * * * *